United States Patent
Matsuda

(10) Patent No.: US 7,957,774 B2
(45) Date of Patent: Jun. 7, 2011

(54) HANDS-FREE COMMUNICATION SYSTEM FOR USE IN AUTOMOTIVE VEHICLE

(75) Inventor: Naoki Matsuda, Anjo (JP)

(73) Assignee: Denso Corporation, Kariya (JP)

( * ) Notice: Subject to any disclaimer, the term of this patent is extended or adjusted under 35 U.S.C. 154(b) by 713 days.

(21) Appl. No.: 11/487,786

(22) Filed: Jul. 17, 2006

(65) Prior Publication Data

US 2007/0037607 A1 Feb. 15, 2007

(30) Foreign Application Priority Data

Jul. 27, 2005 (JP) .................. 2005-217169

(51) Int. Cl.
H04M 1/00 (2006.01)

(52) U.S. Cl. ................. 455/569.2; 455/569.1; 455/350; 455/344; 455/345; 379/433.02; 379/432

(58) Field of Classification Search ............... 455/569.1, 455/575.9, 569.2, 344–345, 350; 379/433.02, 379/432
See application file for complete search history.

(56) References Cited

U.S. PATENT DOCUMENTS

| 5,708,718 | A | * | 1/1998 | Ambourn et al. ................. 381/1 |
| 6,085,078 | A | * | 7/2000 | Stamegna ...................... 455/345 |
| 6,731,761 | B1 | * | 5/2004 | Zablocki et al. ................ 381/86 |
| 6,813,577 | B2 |  | 11/2004 | Yoshino et al. |
| 2003/0073408 | A1 | * | 4/2003 | Harrell et al. ................. 455/67.1 |
| 2005/0221877 | A1 | * | 10/2005 | Davis et al. ................. 455/575.9 |
| 2006/0089176 | A1 | * | 4/2006 | Oki ........................... 455/569.1 |

FOREIGN PATENT DOCUMENTS

| JP | 05-191342 | 7/1993 |
| JP | 11-220526 | 8/1999 |
| JP | 2000-209699 | 7/2000 |
| JP | 2002/207500 | 7/2002 |
| JP | 2003-298727 | 10/2003 |
| JP | 2005-047479 | 2/2005 |

OTHER PUBLICATIONS

Notice of Reasons for Rejection mailed Mar. 31, 2009 in a corresponding Japanese application No. 2005-217169.

* cited by examiner

Primary Examiner — Kamran Afshar
Assistant Examiner — Kathy Wang-Hurst
(74) Attorney, Agent, or Firm — Harness, Dickey & Pierce, PLC

(57) ABSTRACT

A hands-free system, through which a driver communicates without using hands with an on-board mobile phone such as a cell phone, is mounted on an automotive vehicle. Plural speakers including a center speaker installed in an instrument panel and door speakers each installed in each door are mounted on the vehicle. Whenever the center speaker is mounted on the vehicle, the center speaker is selected as a speaker from which voices transmitted from the mobile phone are outputted. Only when the center speaker is not mounted, the door speakers are selected. When the center speaker is selected, the voices transmitted from the mobile phone can be heard from a direction to which a driver's eye line is directed. Accordingly, the driver is able to hear the speaker sounds from the natural direction for him/her.

25 Claims, 2 Drawing Sheets

HANDS-FREE COMMUNICATION SYSTEM FOR USE IN AUTOMOTIVE VEHICLE

CROSS-REFERENCE TO RELATED APPLICATION

This application is based upon and claims benefit of priority of Japanese Patent Application No. 2005-217169 filed on Jul. 27, 2005, the content of which is incorporated herein by reference.

BACKGROUND OF THE INVENTION 1. Field of the Invention

The present invention relates to a hands-free communication system for use in an automotive vehicle for communicating with an on-board mobile phone, such as a cell phone. 2. Description of Related Art An example of a hands-free system for an automotive vehicle is disclosed in JP-A-2003-298727. A passenger or a driver on a vehicle is able to communicate with an on-board mobile phone such as a cell phone wirelessly coupled to the hands-free system. Usually, in a conventional hands-free system, a speaker for outputting sounds transmitted from the mobile phone is installed in a door of an automotive vehicle. This kind of speaker is referred to as a door speaker. Since the door speaker is located at a relatively low position in the vehicle, the sounds are outputted from a low position. In some cases, the hands-free system has only one door speaker. When the sounds are outputted from a lower portion of the vehicle, a driver's attention directed to a front of the vehicle may be disturbed by the sounds coming from the low position. This may give an awkward feeling to the driver.

SUMMARY OF THE INVENTION

The present invention has been made in view of the above-mentioned problem, and an object of the present invention is to provide an improved hands-free system for an automotive vehicle, which alleviates the awkward feeling of a driver.

The hands-free system of the present invention is mounted on an automotive vehicle. A driver or a passenger communicates with an on-board mobile phone such as a cell phone through the hands-free system. The hands-free system is constituted together with a navigation device mounted on the vehicle. Plural speakers that output voices or sounds transmitted from the mobile phone are mounted on the vehicle. The plural speakers include a center speaker installed at a center portion of an instrument panel and door speakers each installed in each door.

A central processing unit in the navigation device first finds out how many speakers are mounted on the vehicle and where they are positioned. Then, whether or not the center speaker is included in the plural speakers mounted on the vehicle is checked. If the center speaker is included, the center speaker is selected as a speaker from which the voices or sounds transmitted from the mobile phone are outputted. If there is no center speaker, door speakers other than the center speaker are selected. For example, two door speakers, one in a front-right door and the other in a front-left door, are selected.

If the center speaker is mounted on the vehicle, the center speaker is always selected as a speaker from which voices or sounds transmitted from the mobile phone are outputted. This means that the voices or sounds are outputted in most cases from a front portion of a driver, to which the driver's eye line is directed. Therefore, awkward feeling is not given to the driver.

When the center speaker is selected, parameters that are most appropriate to minimize echo sounds inputted to a microphone from the center speaker are set in an echo canceller. Similarly, most appropriate parameters for the door speakers are set in the echo canceller when the door speakers are selected.

According to the present invention, the voices transmitted from the on-board mobile phone are outputted from a direction natural to a driver in most cases. Other objects and features of the present invention will become more readily apparent from a better understanding of the preferred embodiment described below with reference to the following drawings.

DETAILED DESCRIPTION OF THE PREFERRED EMBODIMENT

Figure 1:
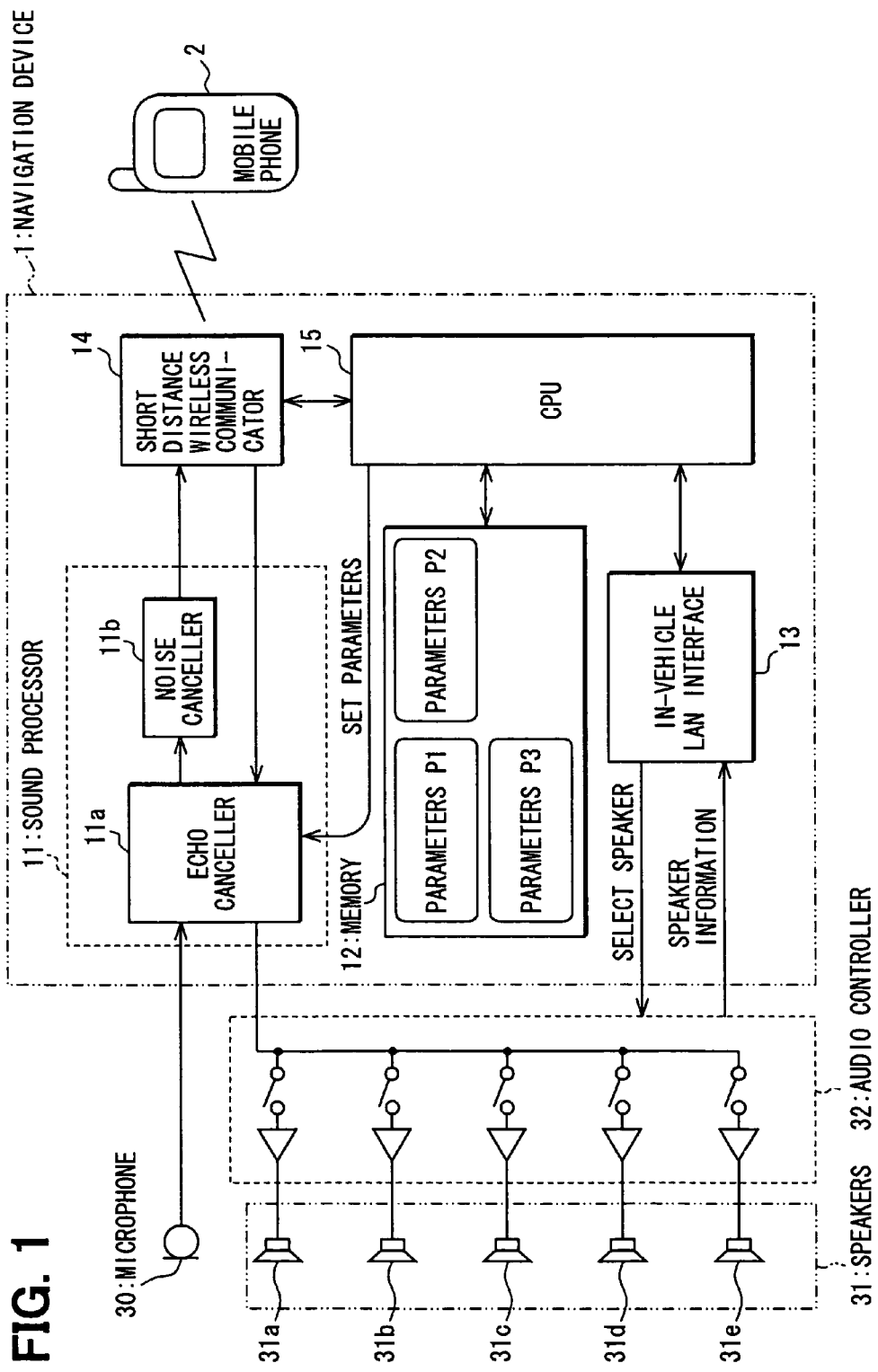
FIG. 1 is a block diagram showing an entire structure of a hands-free system of the present invention.

A preferred embodiment of the present invention will be described with reference to accompanying drawings. First, referring to FIG. 1, a hands-free system constituted together with a navigation device 1 will be described. A mobile phone 2 such as a cell phone wirelessly communicating with the hands-free system is mounted on an automotive vehicle. In addition to the navigation device 1, a microphone 30 for inputting voices in the vehicle, an audio controller 32 for amplifying and switching sounds fed from the navigation device 1 and speakers 31 for outputting sounds fed from the audio controller 32 are mounted on the vehicle.

In this particular embodiment, the speakers 31 include a center speaker 31a installed at a center of an instrument panel of the vehicle, a front-right speaker 31b installed in a front-right door, a front-left speaker 31c installed in a front-left door, a rear-right speaker 31d installed in a rear-right door and a rear-left speaker 31e installed in a rear-left door. The front-right speaker 31b, the front-left speaker 31c, the rear-right speaker 31d and the rear-left speaker 31e are inclusively referred to as door speakers. The center speaker 31a is positioned higher than the door speakers and in a direction of a front view line of a driver.

The audio controller 32 includes an amplifier for amplifying levels of sounds fed from the navigation device 1 and switches for switching speakers that actually output sounds. In the case where no center speaker 31a is installed, a terminal of the audio controller 32 for the center speaker is made open. Similarly, terminals of the audio controller 32 for the door speakers which are not installed are made open. The audio controller 32 feeds speaker information that includes the number of speakers installed on the vehicle and their respective positions in the vehicle to the navigation device 1. When the audio controller 32 receives a command to select speakers from the navigation device 1, it selects a speaker or speakers from which the sounds are outputted.

The navigation device 1 includes a CPU (Central Processing Unit) 15, a sound processor 11 for processing sounds inputted from the microphone 30 and sounds to be outputted from the speakers, a memory 12 having ROM and RAM therein, an interface 13 for connecting the CPU 15 to the audio controller 32 and other on-board devices via an in-vehicle LAN (Local Area Network), and a short distance wireless communicator 14 for wirelessly communicating with the mobile phone 2. The communication with the mobile phone 2 is performed under Bluetooth (a trademark) or infrared communication, for example. The navigation device 1 also includes a position detector such as a GPS (Global Positioning System), a map-data inputting device for inputting map-data, and a display panel for displaying maps or other information thereon.

The sound processor 11 includes an echo-canceller 11a for canceling echo that reaches to the microphone 30 from the speakers and a noise canceller 11b for canceling noises included in outputs from the echo canceller 11a. Characteristics of the echo canceller 11a can be adjusted or controlled by setting proper parameters therein according to speakers selected for outputting sounds. The memory 12 stores parameters to be set in the echo canceller 11a according to selected speakers to optimize the echo-canceling characteristics. For example, parameters P1 to be set when only the center speaker 31a is selected, parameters P2 to be set when all the door speakers 31b-31e are selected, and parameters P3 to be set when front speakers 31b, 31c are selected are stored in the memory 12. Other parameters corresponding to other situations are similarly stored.

The interface 13 is connected to the audio controller 32 via the in-vehicle LAN. The CPU 15 communicates with the audio controller 32 via the in-vehicle LAN. The mobile phone 2 includes a CPU, a wireless portion for communicating with networks, a microphone for inputting user's voice, a speaker for outputting received voices, a voice processor for processing voices inputted by the user and voices received from outside, a key-board, a memory having RAM and ROM, and a short distance communication device for wirelessly communicating with the navigation device 1. These components are not shown in the drawings and not explained in detail because these components are all well known.

Figure 2:
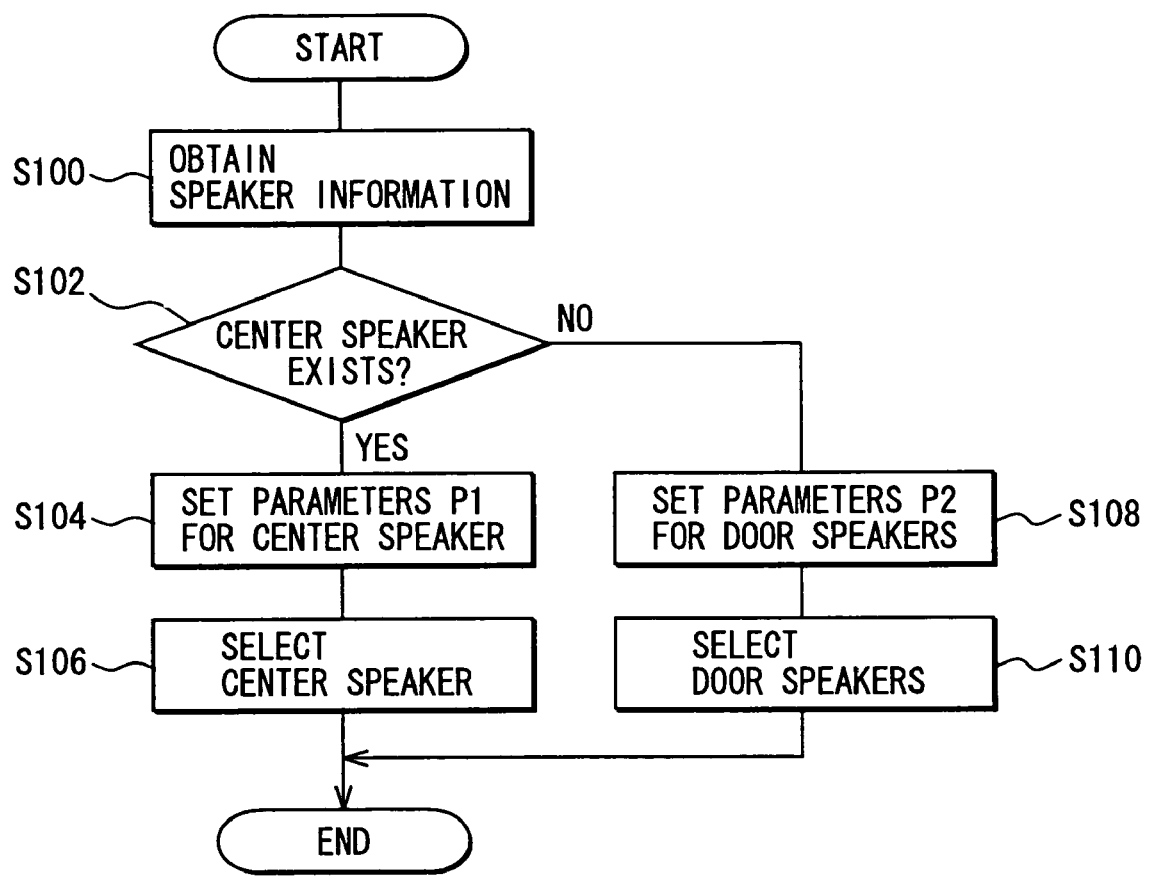
FIG. 2 is a flowchart showing a process of selecting speakers in the hands-free system.

Now, referring to FIG. 2, a process of selecting speakers will be described in detail. Upon turning on an ignition switch of the vehicle, the CPU 15 in the navigation device 1 is turned on, and the process of selecting speakers shown in FIG. 2 starts. At step S100, speaker information including the number of speakers mounted on the vehicle and respective positions thereof is obtained. That is, when the speaker information is requested by the CPU 15, the audio controller 32 supplies the information about the speakers connected thereto to the CPU 15. Then, at step S102, whether the center speaker 31a is installed or not is checked based on the speaker information.

If the center speaker 31a is installed, the process proceeds to step S104, where parameters P1 are read out from the memory 12 and set in the echo canceller 11a. The parameters P1 are the most appropriate parameters to be set in the echo canceller, when the center speaker 31a is selected, to minimize the echo that reaches the microphone 30 from the center speaker 31a. Then, at step S106, the center speaker 31a is selected and connected to the audio controller 32. Thus, the voices received by the mobile phone 2 are outputted from the center speaker 31a after amplified in the audio controller 32. Then, the process comes to the end.

If it is determined that the center speaker 31a is not installed at step S102, the process proceeds to step S108. At step S108, parameters P2 are read out from the memory 12 and set in the echo canceller 11a. The parameters P2 are the most appropriate parameters to be set in the echo canceller 11a, when all of the door speakers 31b-31e are selected, to minimize the echo that reaches the microphone 30 from the door speakers 31b-31e. Then, the process proceeds to step S110, where the door speakers 31b-31e are selected and connected to the audio controller 32. Thus, the voices received by the mobile phone 2 are outputted from the door speakers 31b-31e after amplified in the audio controller 32. Then, the process comes to the end. As illustrated in FIG. 2, the process proceed from start to end without communication from a user and without taking into consideration a location of the user in the automotive vehicle.

As described above, the center speaker 31a is selected whenever the center speaker 31a is installed in the vehicle, and only when the center speaker 31a is not installed, the door speakers 31b-31e are selected. If the mobile phone voices are outputted from the center speaker 31a, awkward feeling is not given to a driver because the center speaker 31a is positioned in front of the driver to which his/her eye line is directed when driving. In this manner, comfort and safety in driving are enhanced.

The present invention is not limited to the embodiment described above, but it may be variously modified. For example, though the mobile phone 2 is wirelessly coupled to the navigation device 1 in the above embodiment, it may be connected through wires. The mobile phone 2 is not limited to a cell phone but it may be replaced with other mobile terminals such as a PHS or a PDA. Though only the center speaker 31a is selected when the center speaker 31a is installed in the above embodiment, it is possible to select front door speakers 31b, 31c in addition to the center speaker 31a. It is also possible to select all the door speakers 31b-31e in addition to the center speaker 31a. Though the center speaker 31a is positioned at the center of the instrument panel in the foregoing embodiment, the center speaker 31a may be positioned at left or right side of the instrument panel.

Though the audio controller 32 in the above embodiment includes a function of amplifying the voices sent from the mobile phone 2, the amplifying function may be performed in the navigation device 1. It is also possible to include the audio controller 32 in the navigation device 1. The process of selecting speakers is realized by software in the above embodiment, it may be possible to realize the selection of the speakers by means of hardware.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A hands-free communication system for use in an automotive vehicle for communicating with an on-board mobile phone, the hands-free system comprising:
    means for determining a specific location for each of a plurality of speakers mounted on the automotive vehicle when an ignition switch of the automotive vehicle is turned on;
    means for checking whether a center speaker mounted on an instrument panel of the automotive vehicle is included in the speakers mounted on the automotive vehicle based on the specific location of each of the speakers determined by the determining means; and
    means for selecting at least one speaker, from which sounds transmitted from the on-board mobile phone are outputted, from among the plurality of speakers mounted on the automotive vehicle based only on the specific locations of the plurality of speakers on the automotive vehicle without communication from a user and regardless of information about a communicating party with which external communication out of the automotive vehicle is made through the hands-free communication system; wherein the selecting means selects the center speaker when the checking means determines that the center speaker is included in the plurality of speakers mounted on the automotive vehicle such that a speaker in a driver's eye line is selected.

2. The hands-free communication system as in claim 1, wherein:
when the checking means determines that the center speaker is not mounted on the automotive vehicle, the selecting means selects door speakers installed in doors of the automotive vehicle.

3. The hands-free communication system as in claim 1, further including a microphone installed in the automotive vehicle, an echo canceller for canceling echo that reaches the microphone from the speakers, and a memory storing parameters to be set in the echo canceller according to selected speakers to minimize the echo reaching the microphone from the selected speakers, wherein:
the parameters which are most appropriate to minimize the echo reaching the microphone from the center speaker are set in the echo canceller.

4. The hands-free communication system as in claim 2, further including a microphone installed in the automotive vehicle, an echo canceller for canceling echo that reaches the microphone from the speakers, and a memory storing parameters to be set in the echo canceller according to selected speakers to minimize the echo reaching the microphone from the selected speakers, wherein:
the parameters which are most appropriate to minimize the echo reaching the microphone from the door speakers are set in the echo canceller.

5. The hands-free communication system as in claim 1, wherein:
the on-board mobile phone is wirelessly coupled to the hands-free communication system.

6. The hands-free communication system as in claim 1, wherein the determining means receives information of the plurality of speakers mounted on the vehicle from an audio controller of the hands-free system.

7. The hands-free communication system as in claim 1, wherein the selecting means always selects the center speaker when the checking means determines the center speaker is included in the speakers mounted in the automotive vehicle.

8. A hands-free communication system for use in an automotive vehicle for communicating with an on-board mobile phone, the hands-free system comprising:
means for determining a specific location for each of a plurality of speakers mounted on the automotive vehicle;
means for checking whether a center speaker mounted on an instrument panel of the automotive vehicle is included in the speakers mounted on the automotive vehicle based on the specific location of each of the plurality of speakers determined by the determining means; and
means for selecting at least one speaker, from which sounds transmitted from the on-board mobile phone are outputted, from among the plurality of speakers mounted on the automotive vehicle based only on the specific locations of the plurality of speakers on the automotive vehicle without communication from a user and regardless of information about a communicating party with which external communication out of the automotive vehicle is made through the hands-free communication system; wherein
the selecting means always selects the center speaker when the checking means determined the center speaker is included in the speakers mounted in the automotive vehicle such that a speaker in a driver's eye line is selected.

9. The hands-free communication system as in claim 8, wherein:
when the checking means determines that the center speaker is not mounted on the automotive vehicle, the selecting means selects door speakers installed in doors of the automotive vehicle.

10. The hands-free communication system as in claim 9, further including a microphone installed in the automotive vehicle, an echo canceller for canceling echo that reaches the microphone from the speakers, and a memory storing parameters to be set in the echo canceller according to selected speakers to minimize the echo reaching the microphone from the selected speakers, wherein:
the parameters which are most appropriate to minimize the echo reaching the microphone from the door speakers are set in the echo canceller.

11. The hands-free communication system as in claim 8, further including a microphone installed in the automotive vehicle, an echo canceller for canceling echo that reaches the microphone from the speakers, and a memory storing parameters to be set in the echo canceller according to selected speakers to minimize the echo reaching the microphone from the selected speakers, wherein:
the parameters which are most appropriate to minimize the echo reaching the microphone from the center speaker are set in the echo canceller.

12. The hands-free communication system as in claim 8, wherein:
the on-board mobile phone is wirelessly coupled to the hands-free system.

13. A method for selecting at least one speaker from a plurality of speakers of a hands-free communication system mounted on an automotive vehicle, the method comprising:
obtaining a specific location of each of the plurality of speakers mounted on the vehicle after an ignition switch of the automotive vehicle has been turned on;
checking whether a center speaker mounted on an instrument panel of the automotive vehicle is included in the plurality of speakers based on the specific location of each of the plurality of speakers;
selecting at least one speaker of the plurality of speakers from which sounds are outputted based only on the specific locations of the plurality of speakers on the automotive vehicle without communication from a user and regardless of information about a communicating party which is made through the hands-free communication system; and
selecting the center speaker when the checking step determines that the center speaker is included in the plurality of speakers such that a speaker in a driver's eye line is selected.

14. The method according to claim 13, wherein the selecting step selects speakers installed in a door of the automotive vehicle when the checking step determines that the center speaker is not included in the plurality of speakers.

15. The hands-free communication system as in claim 1, wherein the selecting means selects the at least one speaker without making any external communication to outside of the automotive vehicle through the hands-free communication system.

16. The hands-free communication system as in claim 8, wherein the selecting means selects the at least one speaker without making any external communication to outside of the automotive vehicle through the hands-free communication system.

17. The method according to claim 13, wherein the selecting step selects the at least one speaker of the plurality of speakers without making any external communication to outside of the automotive vehicle through the hands-free communication system.

18. The hands-free communication system as in claim 1, wherein the selecting means always selects only the center speaker when the checking means determines that the center speaker is included in the plurality of speakers mounted on the automotive vehicle.

19. The hands-free communication system as in claim 8, wherein the selecting means always selects only the center speaker when the checking means determines that the center speaker is included in the plurality of speakers mounted on the automotive vehicle.

20. The method according to claim 13, wherein the step of selecting the center speaker always selects only the center speaker when the checking step determines that the center speaker is included in the plurality of speakers.

21. The hands-free communication system as in claim 1, wherein the selecting means selects the at least one speaker without taking into consideration a location of a user in the automotive vehicle.

22. The hands-free communication system as in claim 8, wherein the selecting means selects the at least one speaker without taking into consideration a location of a user in the automotive vehicle.

23. The method according to claim 13, wherein the selecting the at least one speaker step selects the at least one speaker without taking into consideration a location of a user in the automotive vehicle.

24. The hands-free communication system as in claim 1, further including a microphone installed in the automotive vehicle, an echo canceller for canceling echo that reaches the microphone from the speakers, and a memory storing a plurality of parameters to be set in the echo canceller, each parameter corresponding to a specific set of speakers to minimize the echo reaching the microphone from the specific set of speakers, wherein:

the parameters which are most appropriate to minimize the echo reaching the microphone from the center speaker are set in the echo canceller when the center speaker is the specific set of speakers.

25. The hands-free communication system as in claim 2, further including a microphone installed in the automotive vehicle, an echo canceller for canceling echo that reaches the microphone from the speakers, and a memory storing a plurality of parameters to be set in the echo canceller, each parameter corresponding to a specific set of speakers to minimize the echo reaching the microphone from the selected speakers, wherein:

the parameters which are most appropriate to minimize the echo reaching the microphone from the door speakers are set in the echo canceller when the door speakers are the specific set of speakers.

* * * * *